Armand L. Camus
Gerald J. Fortier
INVENTORS

United States Patent Office 3,625,059
Patented Dec. 7, 1971

3,625,059
REMOTE CRYOGENIC TEMPERATURE INDICATING SYSTEM
Armand L. Camus, Westford, and Gerald J. Fortier, Danvers, Mass., assignors to Cryogenic Technology, Inc., Waltham, Mass.
Filed Aug. 8, 1968, Ser. No. 751,214
Int. Cl. G01k 1/02, 1/14, 7/22
U.S. Cl. 73—343.5      1 Claim

ABSTRACT OF THE DISCLOSURE

A device for accurately observing and recording cryogenic temperatures remote from the actual cryogenic equipment. A thermistor is mounted on the refrigerator at the point where the temperature is to be determined, and lead wires from the thermistor are connected to a circuit which includes a meter and its associated circuit, a standardization resistant circuit in parallel with the meter circuit, and a switch adapted to selectively connect either the standardization resistant circuit or the thermistor circuit. The combination of thermistor, mounting, and circuit eliminates varations in temperatures measurement which may be brought about by self-heating within the thermistor due to large power dissipation within the circuit.

---

This invention relates to a temperature measuring device and more particularly to one designed to accurately and continuously measure cryogenic temperatures remote from the point where the cryogenic temperatures are developed.

Cryogenic refrigerators such as are disclosed in U.S. Pats. 2,906,101, 2,966,035 and 3,218,815 are completely insulated, at least around the cold end of the refrigerator; and, therefore, no direct measurement of temperature is possible. Moreover, at cryogenic temperatures most temperature-measuring devices are not usable; or if they are, they are not reliable, are very expensive, or cannot be located remote from the refrigerator. With the availability of the so-called thermistor (a resistor of special material the resistance of which increases with decreasing temperature), attempts have been made to use these elements for remote measurements of temperature. Thermistors have several advantages for cryogenic temperature measurements; and among these may be listed a high negative temperature coefficient of resistance, small size with corresponding small thermal capacity, and an output (resistance) which is readily converted to an electrical signal capable of being read directly and recorded.

However, the thermistor also has several inherent drawbacks, chief among these being a tendency to self-heat which alters temperature calibrations when a relatively large current (i.e., one which develops 100 to 200 microwatts) is supplied to the thermistor. This results in an intolerable degree of unreliability over a workable temperature range when accurate measurements are desired. These drawbacks have not been entirely overcome in prior art devices which have placed the thermistor as an unknown resistance in one arm of a Wheatstone bridge and used a galvanometer as a detecting means; used the thermistor in a simple ohmmeter circuit; or incorporated a standard resistance and a thermistor in a circuit to measure and compare the voltage drops across them by suitable means such as a potentiometer. Sufficiently sensitive galvanometers are expansive and very fragile; and any other readout means for a Wheatstone bridge circuit suffers from essentially the same drawbacks. In the typical ohmmeter circuit, the large current passing through the thermistor can bring on self-heating and hence errors in the temperature measurements. Although the method using a standard resistance and potentiometers has some advantages, difficulties are encountered in recording the temperatures so sensed. This is due to the fact that the resistance of a thermistor at cryogenic temperatures may vary between 2000 and 50,000 ohms, a value which is too high to allow any standard strip chart recorder to be used since around 2000 ohms is the maximum source resistance allowable for such recording devices if good sensitivity is desired.

Because of the advantages inherent in the use of thermistors in measuring cryogenic temperatures, it would be desirable to employ them in a manner to provide rugged, reliable circuitry and to avoid the disadvantage of self-heating.

It is, therefore, a primary object of this invention to provide a remotely located reliable means for measuring cryogenic temperatures. It is another object of this invention to provide a temperature measuring means of the character described incorporating a thermistor capable of providing an electrical signal which is a function of the temperature sensed by the thermistor. It is another object of this invention to provide such a device which may have incorporated in it recording means and a warning system in case of failure of the measuring circuit sensing thermometer or refrigerator itself. Other objects of the invention will in part be obvious and will in part be apparent hereinafter.

The invention accordingly comprises the features of construction, combinations of elements and arrangements of parts which will be exemplified in the constructions hereinafter set forth; and the scope of the invention will be indicated in the claim.

For a fuller understanding and objects of the invention, reference should be had to the following detailed description taken in connection with the accompanying drawings in which FIG. 1 is a side elevational view of a portion of a cryogenic refrigerator showing the attachment to it of the temperature-measuring device of this invention;

Figure 1:
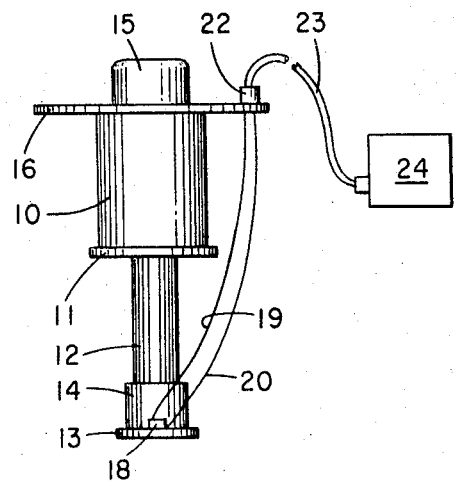

FIG. 1 illustrates the manner in which the temperature-measuring device of this invention is attached to the coldest end of a cryogenic refrigerator such as is disclosed and claimed in U.S. Pat. 3,218,815. The refrigerator illustrated in FIG. 1 is a two-stage refrigerator having an upper warmer stage 10, which has a heat station 11 associated with it, and a lower stage 12, which has a flange 13 (typically made of copper) mounted on a heat station 14, which surrounds the coldest expansion chamber of the refrigerator such as chamber 51 in FIG. 6 of U.S. Pat. 3,218,815. The refrigerator is operated through a cross head 15 which is external of the insulated housing, the cover member 16 of which is shown. The thermistor assembly 18 (shown in detail in FIGS. 2 and 3) is mounted on flange 13, and from it lead wires 19 and 20 are passed through housing cover 16 by means of suitable insulation 22 and are connected to the circuit external of the refrigerator through cable 23. The components making up the circuit are located within a suitable housing 24 which also contains a suitable power supply. It is, of course, within the scope of this invention to mount the thermistor assembly at any point on the refrigerator, that shown in FIG. 1 being only illustrative, and to orient the refrigerator into any desired position.

Figure 2:
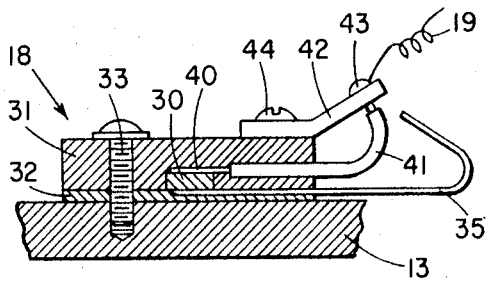
FIGS. 2 and 3 are cross sectional and top plane views of the mounting means for attaching the thermistor to the cryogenic refrigerator.
Figure 3:
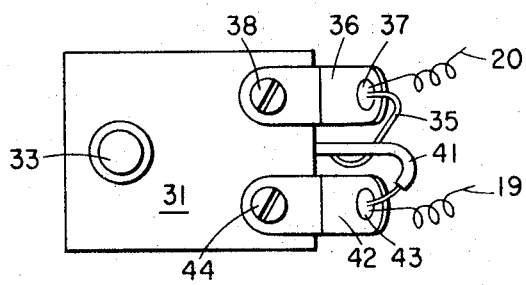

FIGS. 2 and 3 illustrate in detail the way in which the thermistor is mounted to the refrigerator in order to be cooled by heat exchange to the temperature, for example, within the coldest expansion engine of the refrigerator. A commercially available thermistor 30 is mounted in a block 31 formed of material which is electrically nonconducting and which has a very low thermal conductivity. Micarta has been found to be a suitable material for this mounting block. The bottom face of the thermistor 30 is in direct contact with a shim 32 formed of a relatively soft material which has high thermal conductivity at cryogenic temperatures. Indium is a particularly good material for this purpose. The assembly is affixed to flange 13 by means of a screw 33. A lower lead wire 35 from thermistor 30 extends along a depression in the shim 32, the depression being formed in the shim through pressure applied during the assembly. As will be seen in FIG. 3, this lower lead wire 35 is connected to a lug 36 by solder 37 which forms an electrical connection with lead wire 20. The lug 36 in turn is affixed to the mounting block through a screw 38. The upper lead wire 40 of the thermistor is encased in a Teflon (polytetrafluoroethylene) sleeve 41 to insulate it, and it leads out from the block to be connected to lug 42 through solder 43 which make an electrical contact with lead wire 19. Lug 42 is also attached to the mounting block through screw 44. Lead wires 19 and 20 are then connected externally with the circuit as is illustrated in FIG. 1.

Figure 4:
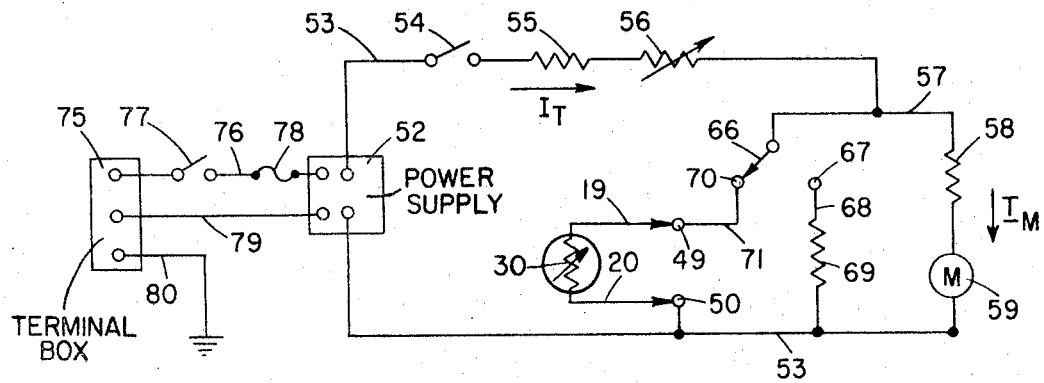
FIG. 4 is a diagram for the basic circuit of the temperature-measuring device of this invention.

FIG. 4 is a diagram of the circuit of the temperature-measuring device. The lead wires 19 and 20 are connected to terminals 49 and 50, respectively, of the circuit. This circuit may be seen to comprise a D.C. power supply 52 and a principal circuit 53 which includes a meter circuit 57, standardization circuit 68, and a thermistor circuit 71. A switch 54 and two resistors 55 and 56, the latter being variable, are incorporated in the circuit ahead of the three parallel branches 57, 68, and 71. In the meter circuit there are a resistor 58 and meter 59 which, of course, has a characteristic resistance. The standardization circuit 68 has a switch terminal 67 and a standard resistor 69. The thermistor circuit 71 includes a switch terminal 70, the terminals 49 and 50, lead wires 19 adn 20, and thermistor 30. Switch 66 permits selectively connecting either the standardization circuit or the thermistor circuit in parallel with the meter circuit.

A terminal box 75 is shown in FIG. 4 to be connected through leads 76 and 79, switch 77, and fuse 78 to the power supply 52. The terminal box also has a ground 80.

The operation of the temperature-measuring apparatus of this invention may be described with reference to the following example which is meant to be illustrative and not limiting. The power supply may be batteries, a regulated D.C. power supply or any suitable constant current source. Assume in this example that it it a regulated D.C. power supply supplying 60 volts. Resistor 55 is made sufficiently large (e.g., 1365K ohms) to limit the total current $I_T$ to a small acceptable value, e.g., about 50 microamperes or less. Resistor 56 is adjustable for calibration and in this example would be set to provide a resistance of 125K ohms. Resistors 69 is selected for good stability and lower temperature coefficient. It is preferably of a wire-wound type and has a resistance of about 20K ohms. Resistor 58, in series with meter 59, is selected so that the sum of its resistance and that of meter 59 equals the resistance in resistor 69 or 20K ohms. The meter is preferably a microammeter of typically 20 microamperes full scale.

If in operation switch 66 is moved to engage terminal 67 to connect the standardization circuit 68, the total current $I_T$ will divide equally between the two legs of the circuit, i.e., between meter circuit 57 and standardization circuit 68. If the meter is selected for a full-scale value of 20 microamperes, then $I_T$ is 40 microamperes when resistor 56 is adjusted to give full-scale on meter 59.

When switch 66 is then turned to engage terminal 70 and connect in the thermistor circuit 71 to be in the measuring position, the total circuit is formed of meter circuit 57 and thermistor circuit 71 in parallel. The current passing through meter 59 is now a function of the resistance in the thermistor, and its value is indicative of the ohmic value of the thermistor.

Under these conditions, the current through the meter, $I_M$, may be expressed as $$I_M = I_T \left[ \frac{R_{30}}{R_{59}+R_{58}+R_{30}} \right]$$

where $R_{30}$ is the ohmic resistance of thermistor 30. Knowing $I_T$, $R_{59}$ and $R_{58}$, a resistance scale may be established for the meter and correlated with temperature to give a direct reading, e.g., in °K.

In this operational example, the total resistance of the entire circuit during standardization is $R_{55}+R_{56}+$the parallel combination of $R_{69}$ and $R_{58}$ plus $R_{59}$ or 1500K ohms. When the resistance in thermistor 30 is 20K ohms, the total resistance of the circuit is 1500K ohms; and when it is zero, the total resistance is 1490K ohms, or a change of only 10K ohms in 1500. For most purposes this change may be considered negligible or may be taken into account when scaling the meter for temperature readings in °K.

It may also be shown that the resistance in meter 59 may vary widely without introducing any large relative errors in the final temperature measurements. The meter of this example may typically have a resistance of 2000 ohms which would make $R_{58}$ 18,000 ohms. Variations of ±1000 ohms in the meter resistance would have a negligible effect on the measurements so long as the standardization is accomplished under the same conditions. Likewise, the voltage level may be somewhat higher or lower as long as it remains constant during standardization and measurements.

Figure 5:
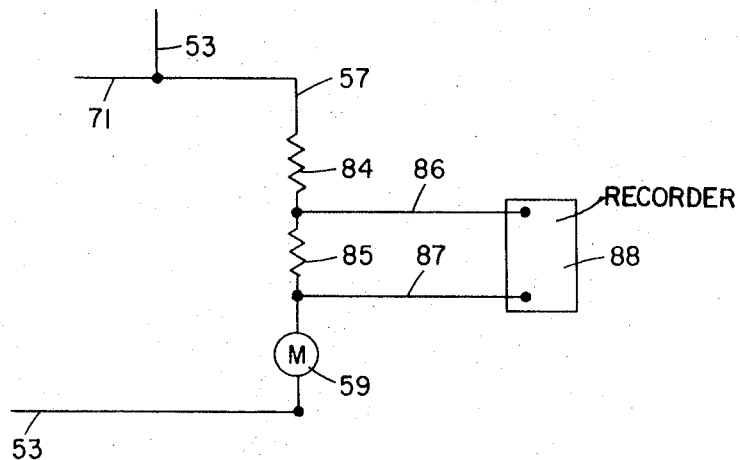
FIG. 5 is a partial circuit diagram showing the incorporation of recording means.
Figure 6:
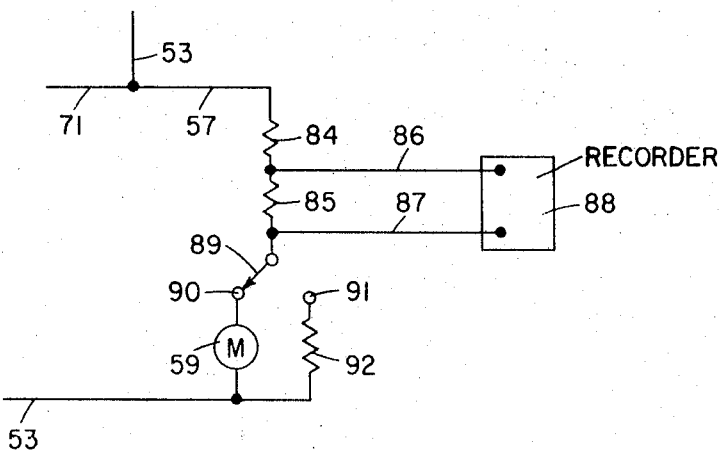
FIG. 6 is a partial circuit diagram showing the incorporation of means for disengaging the meter to eliminate the induced voltages in the meter.

It will normally be desirable to maintain a continuous record of the cryogenic temperature being measured, and for this purpose of suitable recording circuit may be included as illustrated in FIGS. 5 and 6 wherein like components in FIG. 4 are given like reference numerals.

In the circuit of FIG. 5, resistor 58 is split into resistor 84 and 85, resistor 85 having a resistance of about 500 ohms, to continue the illustrative example given for FIG. 4. This will provide an output of 10 millivolts full scale for a recorder circuit comprising leads 86 and 87 and recorder 88. In recorders such as a standard strip chart recorder of the potentiometer type the voltage level is high enough to prevent any problems due to A.C. pickup. The meter 59 may be of the type which has a built-in alarm system which is automatically actuated when the indicator reaches predetermined adjustable minimum and maximum values. Thus, it is possible to be warned in any suitable manner if the temperature fluctuations exceed set limits, or if the power supply, the thermistor, or the refrigerator fails.

In the arrangement of FIG. 6, an added switch 89 and terminals 90 and 91 make it possible to replace the meter 59 by its equivalent resistance 92 during recording. By cutting out meter 59, it is possible to avoid any possible induced voltages created by mechanical vibrations in the meter which may be reflected in the recorder 88.

Since the resistances of leads 19 and 20 are negligible compared to that of the thermistor in the cryogenic temperature range, it is possible to place the terminal box, circuit housing, meter and recorder at a position remote from the point of the refrigerator which is being monitored. Selection of and adjustments in the various circuit components permit a relative wide flexibility in apparatus performance, thus making it possible to measure cryogenic temperatures over any desired range.

It will be apparent that the entire circuit is formed of essentially all passive components as compared to one which would include, for example, an electronic null detector and its associated problems of ground loops, or pick-up, capacitive coupling, and the like. Thus, the apparatus of this invention is reliable and accurate. It is moreover, rugged in construction, permitting it to be located in any convenient locaton and to be transferred from place to place.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

We claim:

1. A device for measuring temperatures within the cryogenic range, comprising in combination
   (a) a thermistor;
   (b) mounting means adapted to attach said thermistor in heat exchange relationship to cryogenic apparatus, said mounting means comprising a block of an electrically nonconducting, low thermal conductivity material holding said thermistor so that one of its surfaces is in contact with a shim of a relatively soft, high thermal conductivity material serving as a thermal connection between said thermistor and a cold surface of said cryogenic apparatus the temperature of which is to be measured; and
   (c) measuring means adapted to measure the resistance across said thermistor as a function of the cryogenic temperature, and comprising a circuit which includes
   (1) a D.C. power supply,
   (2) variable resistance means,
   (3) three parallel branch circuits, the first branch meter circuit including a meter, resistance means, a recording means and an alternative circuit parallel to that portion of said meter circuit which includes said meter, said alternative circuit having incorporated therein resistance means equivalent to the resistance of said meter, and first branch circuit switch means adapted to selectively connect said alternative circuit or said portion of said meter circuit into said circuit whereby any induced voltages in said meter may be eliminated in the signals transmitted to said recording means; the second branch standardization circuit including a standard resistance, and the third branch thermistor circuit including said thermistor, and
   (4) switch means adapted to selectively connect said second branch standardization circuit or said third branch thermistor circuit in parallel with said first branch meter circuit.

References Cited

UNITED STATES PATENTS 3,377,862  4/1968  Gheorghiu _____ 73—362 R
3,485,102  12/1969  Glick _____ 73—362 R LOUIS R. PRINCE, Primary Examiner F. SHOON, Assistant Examiner U.S. Cl. X.R.

73—362; 338—30